(12) United States Patent
Aguirrezabal Ondarra et al.

(10) Patent No.: US 10,884,399 B2
(45) Date of Patent: Jan. 5, 2021

(54) PRESS INSTALLATION AND CONTROL METHOD FOR A PRESS INSTALLATION

(71) Applicant: FAGOR ARRASATE, S. COOP., Arrasate (ES)

(72) Inventors: Pedro Aguirrezabal Ondarra, Bergara (ES); Unai Argarate Belategi, Bilbao (ES)

(73) Assignee: FAGOR ARRASATE S. COOP., Arrasate (ES)

( * ) Notice: Subject to any disclaimer, the term of this patent is extended or adjusted under 35 U.S.C. 154(b) by 307 days.

(21) Appl. No.: 16/027,516

(22) Filed: Jul. 5, 2018

(65) Prior Publication Data
US 2019/0025802 A1 Jan. 24, 2019

(30) Foreign Application Priority Data

Jul. 19, 2017 (ES) .................................. 201730946

(51) Int. Cl.
*G05B 19/418* (2006.01)
*B21D 43/00* (2006.01)
(Continued)

(52) U.S. Cl.
CPC ..... *G05B 19/41815* (2013.01); *B21D 43/003* (2013.01); *B21D 43/026* (2013.01); (Continued)

(58) Field of Classification Search
CPC .... G05B 19/41815; G05B 2219/39105; G05B 2219/45142; G05B 2219/2622; (Continued)

(56) References Cited

U.S. PATENT DOCUMENTS 8,096,233 B2 * 1/2012 Kaneko .................. B21D 43/05 100/207
9,206,488 B2 * 12/2015 Ishiguro ............... B21D 22/022 (Continued)

FOREIGN PATENT DOCUMENTS

EP 1996394 3/2008
EP 2808750 A1 12/2014
(Continued)

OTHER PUBLICATIONS

Spanish Patent Office Search Report in corresponding Spanish Application No. 201730946, dated May 8, 2018.

*Primary Examiner* — Shelley M Self
*Assistant Examiner* — Teresa A Guthrie
(74) *Attorney, Agent, or Firm* — Edell, Shapiro & Finnan, LLC

(57) ABSTRACT

Control method for a press installation and installation, where the installation includes a servo press, a conveyor device for conveying pieces from a position of origin to the servo press, and a controller. The controller controls the movements of the conveyor device and of the servo press by means of one and the same master signal, causing a synchronized actuation of both. In the method, the pieces are conveyed to the position of origin and during the travel thereof until reaching the position of origin, the passage of the pieces through a predetermined position of reference before the position of origin is detected, and depending on the detection, the master signal is adjusted for adapting the actuation speed of the servo press.

18 Claims, 1 Drawing Sheet

(51) Int. Cl.
    *B21D 43/02*     (2006.01)
    *B30B 15/14*     (2006.01)
    *B30B 15/26*     (2006.01)
    *B21D 55/00*     (2006.01)
    *B30B 15/30*     (2006.01)

(52) U.S. Cl.
    CPC ........... *B21D 43/027* (2013.01); *B21D 55/00* (2013.01); *B30B 15/148* (2013.01); *B30B 15/26* (2013.01); *B30B 15/30* (2013.01); *G05B 2219/2622* (2013.01); *G05B 2219/39105* (2013.01); *G05B 2219/45142* (2013.01)

(58) Field of Classification Search
    CPC ........... G05B 2219/31076; G05B 2219/31274; G05B 2219/31446; B21D 43/003; B21D 43/027; B21D 55/00; B21D 43/026; B21D 43/025; B21D 43/02; B30B 15/148; B30B 15/26; B30B 15/30

USPC ......................................................... 100/45
    See application file for complete search history.

(56)     References Cited

U.S. PATENT DOCUMENTS

2012/0272839 A1*   11/2012   Kaneko ................ B30B 15/146
                                                                   100/43
2016/0243780 A1     8/2016   Suzuki

FOREIGN PATENT DOCUMENTS

| EP | 1996394 B1 | 5/2016 |
|---|---|---|
| GB | 1099192 | 1/1968 |
| JP | H1147999 A1 | 2/1999 |
| JP | 2008173642 A | 7/2008 |

* cited by examiner

PRESS INSTALLATION AND CONTROL METHOD FOR A PRESS INSTALLATION

CROSS-REFERENCE TO RELATED APPLICATIONS

This application relates to and claims the benefit and priority to Spanish Patent Application No. P201730946, filed Jul. 19, 2017.

TECHNICAL FIELD

The present invention relates to control methods for press installations comprising at least one servo press, and to press installations comprising at least one servo press.

BACKGROUND

Press installations comprising at least one servo press and a conveyor device for conveying pieces from a position of origin to the servo press are known. Servo presses are designed for pressing on the pieces. The conveyor device holds the corresponding piece in a position of origin and conveys the piece to the servo press (to the position in the servo press so that the servo press can then press on it).

To improve installation efficiency, it is important to link the actuation of the servo press and of the conveying device, so as to make the most of the time that is available. To that end, using a master signal which is used for controlling the actuations of the servo press and of the conveying device is known, such that the circumstances of both the servo press and the conveying device are taken into account when generating the master signal.

Patent document EP2808750A1 discloses a control method for such a press installation. The installation comprises a servo press, a conveyor device for conveying pieces from a position of origin to the servo press, and a controller. The controller controls the movements of the conveyor device and of the servo press by means of one and the same master signal, causing a synchronized actuation of the conveyor device and the servo press.

SUMMARY OF THE DISCLOSURE

A first aspect of the invention relates to a control method for a press installation. The installation comprises at least one servo press, a conveyor device for conveying pieces from a position of origin to the servo press, and a controller. In the method, the controller controls the movements of the conveyor device and of the servo press by means of one and the same master signal, thereby causing a synchronized actuation of the conveyor device and the servo press.

Furthermore, in the method, the pieces are conveyed to the position of origin in a specific manner, and during the travel thereof to reach the position of origin, the passage of the pieces through a predetermined position of reference before the position of origin is detected. Depending on the detection, the master signal is adjusted for adapting the actuation speed of the servo press, increasing or reducing the speed, if necessary, and preventing the servo press from stopping (the actuation of the conveyor device would also be adjusted as a result).

It is thereby assured that, upon the arrival of the piece at the position of origin, the actuation of the conveyor device and of the servo press is always the same regardless of the time it takes for the piece to reach the position, at least until the detection of the passage of a new piece through the position of reference, while at the same time preventing, on one hand, down times of the piece in the position of origin, and particularly preventing, on the other hand, at least the servo press from having to come to a halt waiting for a piece to reach the position of origin, which allows a reduction in power consumption at least with respect to the last passage.

A second aspect of the invention relates to a press installation comprising a servo press, a conveyor device for conveying pieces from a position of origin to the servo press, and a controller configured for controlling the conveyor device and the servo press in a synchronized manner by means of one and the same master signal.

The installation further comprises an additional conveyor device configured for conveying the pieces to the position of origin in a specific manner and a detector which is adapted to detect the passage of the pieces during the travel thereof brought about by the additional conveyor device and which is communicated with the controller. The controller is configured for adjusting the master signal depending on the detection so as to adapt the actuation speed of the servo press on a piece and to prevent the servo press from stopping, by maintaining, increasing, or reducing the speed. The advantages achieved with the installation are the same as those achieved for the control method discussed above.

These and other advantages and features will become evident in view of the drawings and the detailed description.

DETAILED DESCRIPTION

Figure 1:
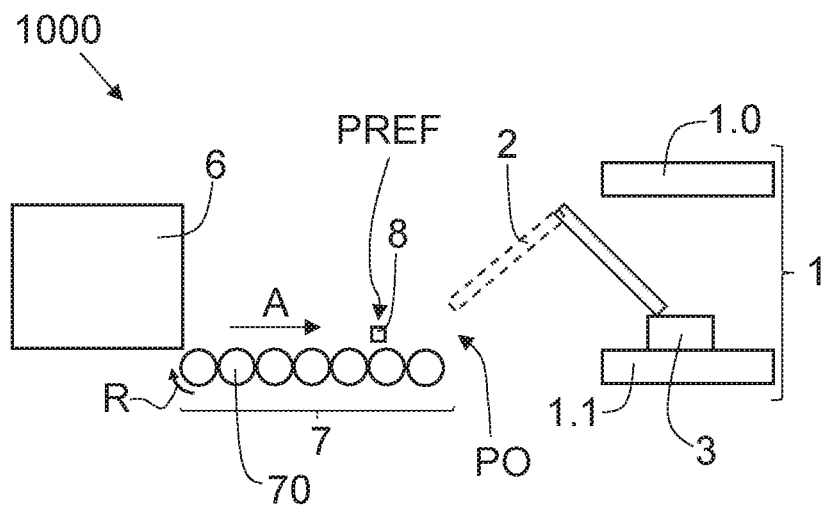
FIG. 1 schematically shows an embodiment of a press installation of the invention, with the servo press of the installation in the open position.

A first aspect of the invention relates to a control method which is adapted to a press installation 1000. The installation 1000 comprises at least one servo press 1, a conveyor device 2 for conveying pieces 3 from a position of origin PO to the servo press 1, and a controller (not depicted in the drawings). In the method, the controller controls the movements of the conveyor device 2 and of the servo press 1 by means of one and the same master signal, causing a synchronized actuation of the conveyor device 2 and the servo press 1.

Furthermore, in the method the pieces 3 are conveyed to the position of origin PO in a specific manner in a forward movement direction A, and during the travel thereof to reach the position of origin PO, the passage of the pieces 3 through a predetermined position of reference PREF before the position of origin PO is detected. Depending on the detection, the master signal is adjusted for adapting the actuation speed of the conveyor device 2 and the actuation of the servo press 1 so as to prevent at least the servo press 1 from stopping.

Depending on the master signal, the controller causes the actuation of the conveyor device 2 and of the servo press 1 in a specific manner (at a specific speed, both actuations being synchronized). If the time it takes for a piece 3 to be arranged in the position of origin PO (or in the position of reference PREF, which is also fixed) is constant, the master signal would not have to be adjusted, and the actuation of the conveyor device 2 and of the servo press 1 would always be the same and the most efficient. However, it cannot be assured that this time is constant, at least without this negatively affecting the productivity and/or efficiency of the installation 1000. Consequently, this time would vary from one piece 3 to another, and as a result of the invention, the actuations of the servo press 1 and of the conveyor device 2 can be adapted to the times to maintain the highest possible productivity and effectiveness, furthermore preventing at least the servo press 1 from stopping unnecessarily. If the time does not vary from one piece 3 to the next piece 3, there would be no adjustment of the master signal (the actuation speed of the servo press 1 and of the conveyor device 2 would be maintained).

The time elapsed between the detection of the passage of a piece 3 through the position of reference PREF and the detection of the passage of the previous piece 3 through the position of reference PREF is determined by means of the detection of the passage of the pieces 3 through the position of reference PREF, the master signal being adjusted depending on the elapsed time.

The master signal is adjusted for speeding up the actuation of the servo press 1 if the determined time is less than a specific reference time, for slowing down the actuation of the servo press 1 if the determined time is greater than the reference time, and for maintaining the actuation speed of the servo press 1 if the determined time is the same as the reference time. In this manner and for each piece 3, the time elapsed from the passage of the previous piece 3 until the passage of the piece 3 through the position of reference PREF is compared with a reference time, the adjustment of the master signal being dependent on the result of the comparison.

In the method, a reference time is determined for each piece 3, the reference time associated with a piece 3 being the time elapsed between the passage of the two pieces 3 before the piece 3 through the position of reference PREF. The adjustment performed in the master signal therefore remains unchanged, the actuation speed of the conveyor device 2 and of the servo press 1 being maintained until an adjustment which changes the actuation speed is required as a result of the comparison.

Figure 2:
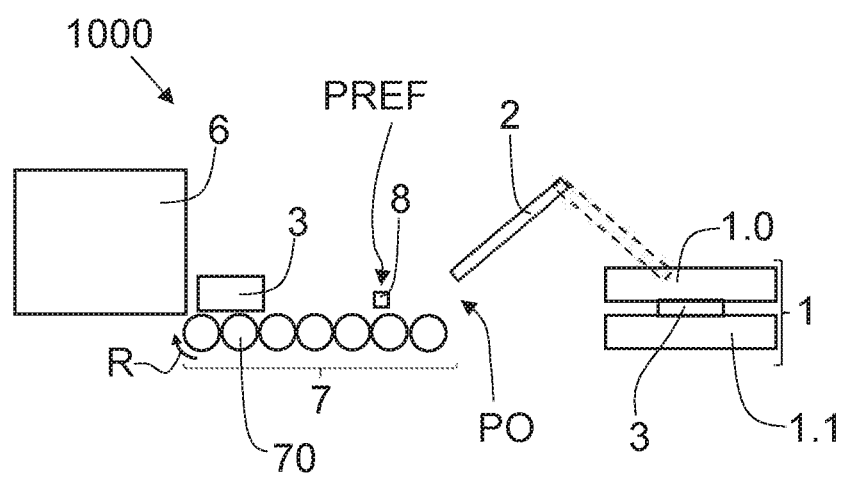
FIG. 2 schematically shows the press installation of FIG. 1, with the servo press of the installation in the closed position.

The position of reference PREF is furthermore selected such that, in the time that the piece 3 needs to reach the position of origin PO from the position of reference PREF, the servo press 1 performs at least one complete cycle. In the invention, the complete cycle of the servo press 1 is considered as the movement thereof from an open position, where an upper die 1.0 and a lower die 1.1 of the servo press 1 are at a maximum distance from one another (FIG. 1), to a closed position, where the dies 1.0 and 1.1 trap the piece 3 between them (FIG. 2), and from the closed position to the open position. The master signal can therefore be freely adjusted in response to the comparison between the determined elapsed time and the corresponding reference time, without the risk of not having time to adapt the actuation speed of the servo press 1 in the time interval that the piece 3 needs to reach the position of origin PO from the position of reference PREF.

The detection of a piece 3 during the passage thereof through the position of reference PREF is preferably performed by means of a laser detector, although it would also be possible to use detectors of another type such as an ultrasound detector, for example.

In the method, the pieces 3 are preferably heated in a furnace 6 before being conveyed to the servo press 1, the pieces 3 being conveyed from the outlet of the furnace 6 to the position of origin PO in the forward movement direction A and the position of reference PREF being located in the path travelled by the piece 3.

A second aspect of the invention relates to a press installation 1000 comprising at least one servo press 1, a conveyor device 2 for conveying pieces 3 from a position of origin PO to the servo press 1, and a controller configured for controlling the conveyor device 2 and the servo press 1 in a synchronized manner by means of one and the same master signal. The controller can comprise a microprocessor, a FPGA, or any equivalent device with computing capacity.

The installation 1000 further comprises an additional conveyor device 7 configured for conveying the pieces 3 to the position of origin PO in a forward movement direction A, and a detector 8 which is adapted to detect the passage of the pieces 3 during the travel thereof brought about by the additional conveyor device 7 and which is communicated with the controller.

The controller is configured for determining the time elapsed between the detection of the passage of a piece 3 through the position of reference PREF and the detection of the passage of the previous piece 3 through the position of reference PREF by means of the detection of the passage of the pieces 3 through the position of reference PREF, and for adjusting the master signal depending on the elapsed time. The controller is configured for performing the adjustment of the master signal for speeding up the actuation of the servo press 1 if the determined time is less than a specific reference time, for slowing down the actuation of the servo press 1 if the determined time is greater than the reference time, and for maintaining the actuation speed of the servo press 1 if the determined time is the same as the reference time.

The controller is furthermore configured for storing the time elapsed between the passage of a piece 3 and of the previous piece 3 through the position of reference PREF, and for using the elapsed time as a reference time in the adjustment of the master signal when the passage of the next piece 3 through the position of reference PREF is detected, the controller thereby being configured for establishing a reference time for each piece 3. The installation 1000 therefore comprises at least one memory (not depicted in the drawings) for saving the elapsed time at least until it has to be used with the passage of the next piece 3 through the position of reference PREF, and the memory can be a specific device or can be integrated in the controller.

The detector 8 is arranged in a fixed manner in the installation 100 in a position in which, in the time that the piece 3 needs to reach from the position of reference PREF to the position of origin PO, the servo press 1 performs at least one complete cycle, as discussed above for the first aspect of the invention (explanation that is likewise applicable for the second aspect of the invention).

The installation 1000 preferably comprises a furnace 6 for heating the pieces 3, and the additional conveyor device 7 is configured and adapted for conveying the pieces 3 from the furnace 6 to the position of origin PO. The additional conveyor device 7 can comprise, for example, a plurality of driven rollers 70 rotating in a direction of rotation R and arranged one after another in the forward movement direction A of the piece 3, the piece 3 being arranged on the rollers 70 at the outlet of the furnace 6 to be conveyed to the position of origin PO. Instead of rollers 70, the additional conveyor device 7 may comprise chains or other mechanical elements which enable the movement of the pieces and are known in the prior art.

The detector 8 is thereby arranged such that the position of reference PREF is a position along the path travelled by the pieces 3, and is preferably a laser detector, although it would also be possible to use detectors of another type such as an ultrasound detector, for example.

The explanations that are provided for the first aspect of the invention and not repeated when explaining the second aspect of the invention are also valid for the second aspect of the invention.

What is claimed is:

1. A control method for a press installation that includes a servo press, a first conveyor device for consecutively conveying first and second pieces from a position of origin to the servo press, and a controller that controls the movement of the first conveyor device and of the servo press by means of the same master signal: the method comprising:

consecutively conveying the first and second pieces to the position of origin through a predetermined position of reference and respectively measuring a first elapsed time and a second elapsed time for the first and second pieces to pass through the predetermined position of reference;

comparing in the controller the second elapsed time with first elapsed time, and based on the comparison of the first and second elapsed times the controller adjusting the master signal causing a synchronized actuation of the first conveyor device and the servo press, the master signal being adjusted to alter the actuation speed of the servo press to prevent the servo press from stopping during the conveyance of the second piece to the servo press;

the master signal being adjusted to speed up the actuation of the servo press if the second elapsed time is less than the first elapsed time, the master signal being adjusted to slow down the actuation of the servo press if the second elapsed time is greater than the first elapsed time, the master signal being adjusted to maintain the actuation speed of the servo press if the second elapsed time is the same as the first elapsed time.

2. The control method according to claim 1, wherein the predetermined position of reference is selected such that in a time it takes for the second piece to reach the position of origin from the predetermined position of reference the servo press performs at least one complete cycle.

3. The control method according to claim 1, further comprising heating the first and second pieces in a furnace before conveying the first and second pieces to the servo press.

4. The control method according to claim 3, wherein the first and second pieces are conveyed from an outlet of the furnace to the position of origin by use of a second conveyor device different from the first conveyor device.

5. The control method according to claim 1, wherein the passage of the first and second pieces through the predetermined position of reference is detected by use of a laser detector.

6. A control method for a press installation that includes a servo press, a first conveyor device for conveying first and second pieces from a position of origin to the servo press, and a controller that controls the movement of the first conveyer device and the movement of the servo press, the method comprising:

conveying the first piece to the position of origin through a predetermined position of reference;

determining a first time elapsed for the first piece to pass through the predetermined position of reference and storing the first time elapsed in a memory of the controller as a reference time;

conveying the second piece to the position of origin through the predetermined position of reference;

determining a second time elapsed for the second piece to pass though the predetermined position of reference;

comparing in the controller the second time elapsed with the reference time;

controlling the movement of the first conveyor device and the movement of the servo press by means of a same master signal emitted by the controller to cause a synchronized actuation of the first conveyor device and the servo press in a manner that prevents the servo press from stopping during the conveyance of the second piece to the servo press, the master signal being adjusted for speeding up the actuation of the servo press if the second elapsed time is less than the reference time, for slowing down the actuation of the servo press if the second elapsed time is greater than the reference time, and for maintaining the actuation speed of the servo press if the second elapsed time is the same as the reference time.

7. The control method according to claim 6, wherein the predetermined position of reference is selected such that in a time it takes for the second piece to reach the position of origin from the predetermined position of reference the servo press performs at least one complete cycle.

8. The control method according to claim 6, further comprising heating the first and second pieces in a furnace before conveying the first and second pieces to the servo press.

9. The control method according to claim 8, wherein the first and second pieces are conveyed from an outlet of the furnace to the position of origin by use of a second conveyor device different from the first conveyor device.

10. The control method according to claim 6, wherein the passage of the first and second pieces through the predetermined position of reference is detected by use of a laser detector.

11. A press installation comprising:
a servo press having an adjustable actuation speed;
a first conveyor for conveying first and second pieces from a position of origin to the servo press;
a controller configured to control an actuation of the first conveyor and of the servo press in a synchronized manner by means of a same master signal;
a second conveyor configured to convey the first and second pieces to the position of origin through a predetermined position of reference;
a detector operatively coupled to the controller and configured to detect first and second elapsed times for the first and second pieces to respectively pass through the predetermined position of reference;
the controller being configured for adjusting the master signal depending on a comparison of the first and second elapsed times to cause the actuation speed of the servo press to be adjusted in a manner that prevents the servo press from stopping between the conveyance of first and second pieces to the servo press.

12. The press installation according to claim 11, wherein the controller is configured to adjust the master signal for speeding up the actuation of the servo press if the second elapsed time is less than the first elapsed time, for slowing down the actuation of the servo press if the second elapsed time is greater than the first elapsed time, and for maintaining the actuation speed of the servo press if the second elapsed time is the same as the first elapsed time.

13. The press installation according to claim 12, wherein the controller is configured to store the first and second elapsed times in a memory device.

14. The press installation according to claim 13, wherein the memory device is comprised in the controller.

15. The press installation according to claim 13, wherein the memory device is separate from the controller and communicable with the controller.

16. The press installation according to claim 11, wherein the detector is arranged in a fixed manner in the press installation such that in a time it takes for the second piece to reach the position of origin from the predetermined position of reference the servo press performs at least one complete cycle.

17. The press installation according to claim 11, further comprising a furnace for heating the first and second pieces, the second conveyor device being configured to convey the first and second pieces from the furnace to the position of origin through the position of reference.

18. The press installation according to claim 11, wherein the detector is a laser detector.

* * * * *